United States Patent
Yoda (10) Patent No.: US 7,148,918 B1
(45) Date of Patent: Dec. 12, 2006

(54) ELECTRONIC CAMERA SYSTEM CAPABLE OF REMOTE DATA STORING

(75) Inventor: Yoshiro Yoda, Tama (JP)

(73) Assignee: Olympus Optical Co., Ltd., Tokyo (JP)

( * ) Notice: Subject to any disclaimer, the term of this patent is extended or adjusted under 35 U.S.C. 154(b) by 834 days.

(21) Appl. No.: 09/594,875

(22) Filed: Jun. 15, 2000

(30) Foreign Application Priority Data

Jun. 21, 1999 (JP) ................................ 11-174088

(51) Int. Cl.
*H04N 5/232* (2006.01)

(52) U.S. Cl. ................................ 348/211.3; 348/207.1; 348/552; 348/231.2

(58) Field of Classification Search ........... 348/211.99, 348/211.1, 211.2, 211.3, 231.1, 207.2, 207.1, 348/220.1, 211.9, 211.14, 231.9, 552, 231.6; 386/95, 120

See application file for complete search history.

(56) References Cited

U.S. PATENT DOCUMENTS

| | | | | |
|---|---|---|---|---|
| 5,367,618 A * | 11/1994 | Ishida | ......................... | 715/542 |
| 5,479,206 A * | 12/1995 | Ueno et al. | ............... | 348/211.5 |
| 5,943,517 A * | 8/1999 | Sato | ............................ | 396/429 |
| 6,104,430 A * | 8/2000 | Fukuoka | ................... | 348/231.6 |
| 6,111,517 A * | 8/2000 | Atick et al. | ................. | 340/5.83 |
| 6,177,956 B1 * | 1/2001 | Anderson et al. | ....... | 348/207.99 |
| 6,192,257 B1 * | 2/2001 | Ray | ............................. | 455/566 |
| 6,262,767 B1 * | 7/2001 | Wakui | .................... | 348/211.99 |
| 6,317,609 B1 * | 11/2001 | Alperovich et al. | ...... | 455/556.1 |
| 6,369,914 B1 * | 4/2002 | Miura | ......................... | 358/403 |
| 6,388,687 B1 * | 5/2002 | Brackett et al. | ............ | 715/810 |
| 6,392,697 B1 * | 5/2002 | Tanaka et al. | ........... | 348/220.1 |
| 6,429,896 B1 * | 8/2002 | Aruga et al. | ........... | 348/231.99 |
| 6,438,320 B1 * | 8/2002 | Hatanaka | .................... | 386/117 |
| 6,438,619 B1 * | 8/2002 | Coman | ........................ | 719/319 |
| 6,445,460 B1 * | 9/2002 | Pavley | ....................... | 358/1.15 |
| 6,522,354 B1 * | 2/2003 | Kawamura et al. | ...... | 348/231.2 |
| 6,535,243 B1 * | 3/2003 | Tullis | ....................... | 348/207.1 |
| 6,642,959 B1 * | 11/2003 | Arai | .......................... | 348/231.3 |
| 6,750,902 B1 * | 6/2004 | Steinberg et al. | ......... | 348/211.3 |
| 6,751,473 B1 * | 6/2004 | Goyal et al. | .............. | 455/556.1 |

(Continued)

FOREIGN PATENT DOCUMENTS

JP     05-167965     7/1993

(Continued)

OTHER PUBLICATIONS

Office Action dated Dec. 17, 2002, issued in counterpart Japanese Patent Application No. 174088/99; Inventor: Yoshiro YODA, and English translation thereof.

*Primary Examiner*—Vivek Srivastava
*Assistant Examiner*—Nelson D. Hernandez
(74) *Attorney, Agent, or Firm*—Frishauf, Holtz, Goodman & Chick, P.C.

(57) ABSTRACT

An electronic camera system of this invention includes an electronic camera for converting an image obtained by sensing into a file and recording the file, a PHS unit attached to the electronic camera to transmit the image file recorded in the electronic camera upon obtaining base station identification information of a master unit in position registration processing according to movement, the master unit having registered the PHS unit as a subsidiary unit, a private base station as the master unit, in which the PHS unit is registered as the subsidiary unit in advance, for transferring the image file sent in position registration processing of the PHS unit, and an electronic album apparatus connected to the private base station to record the image file transferred from the private base station.

7 Claims, 5 Drawing Sheets

U.S. PATENT DOCUMENTS

| | | | |
|---|---|---|---|
| 6,784,924 B1 * | 8/2004 | Ward et al. | 348/207.1 |
| 2001/0028398 A1 * | 10/2001 | Takahashi | 348/232 |
| 2002/0036698 A1 * | 3/2002 | Mizutani | 348/232 |
| 2002/0051527 A1 * | 5/2002 | Monroe | 379/188 |
| 2002/0090208 A1 * | 7/2002 | Hatanaka | 386/117 |
| 2002/0184400 A1 * | 12/2002 | Coman | 709/310 |
| 2003/0007169 A1 * | 1/2003 | Tanaka et al. | 358/1.15 |

FOREIGN PATENT DOCUMENTS

| | | |
|---|---|---|
| JP | 7-202982 | 8/1995 |
| JP | 9-83930 | 3/1997 |
| JP | 10-257367 | 9/1998 |
| JP | 10-341364 | 12/1998 |

* cited by examiner

ELECTRONIC CAMERA SYSTEM CAPABLE OF REMOTE DATA STORING

CROSS-REFERENCE TO RELATED APPLICATIONS

This application claims benefit of Japanese Application No. 11-174088 filed in Japan on Jun. 21, 1999, the contents of which are incorporated by this reference.

BACKGROUND OF THE INVENTION

The present invention relates to an electronic camera system including an electronic camera and electronic album apparatus.

In recent years, electronic cameras for recording sensed image data not in a silver halide film but in a semiconductor memory are becoming popular. Memory cards used in many types of electronic cameras, each of which has a nonvolatile memory encapsulated, are also greatly increasing their capacities.

However, such a memory card has a limited recording capacity. It is very uneconomical to prepare a number of memory cards because their unit price per image data is very high.

Only the following methods are available to store image data for a long time: the image data are transferred to and recorded in a dedicated electronic album apparatus using a hard disk device or magnetooptical disk device and having a larger recording capacity; a personal computer is used as the electronic album apparatus; the images are printed by a printer apparatus, and then, the original image data are erased; or the data are written on a CD-R by digital data service of a general laboratory.

However, to transfer image files to the dedicated electronic album apparatus or apparatus using a personal computer and record the files, the electronic camera and electronic album apparatus must be connected via a cable, or it is necessary to extract only the recording medium from the electronic camera, appropriately insert the extracted recording medium into an adapter and then set it in the electronic album apparatus, and select only untransmitted image files to transfer and record them, resulting in cumbersomeness.

When an image is printed by a printer apparatus, the image cannot be used later as digital data. This method cannot take the advantage of the electronic camera more expensive than a camera using a silver halide film.

For the method of writing the image data on a CD-R by digital data service of a general laboratory, since it is tedious to take the digital data to the laboratory, and the charge for the service is on the user, the load on the user is heavy.

BRIEF SUMMARY OF THE INVENTION

The present invention has been made in consideration of the above situation, and has as its object to provide an electronic camera system capable of automatically transferring an image file recorded in a recording medium of an electronic camera to a recording apparatus and recording the image file without troubling the user.

In order to achieve the above object, according to the first aspect of the present invention, there is provided an electronic camera system comprising:

an electronic camera for converting an image obtained by sensing into a file and recording the file;

a first communication device attached to the electronic camera to transmit the image file recorded in the electronic camera upon receiving base station identification information of a master unit in position registration processing according to movement, the first communication device being registered in the master unit as a subsidiary unit;

a second communication device for transferring the image file sent in position registration processing of the first communication device, the second communication device serving as the master unit in which the first communication device is registered as the subsidiary unit in advance; and a recording apparatus connected to the second communication device to record the image file transferred from the second communication device.

According to this system arrangement, in the communication zone of the master unit, the image file in the camera is automatically transferred to the recording apparatus by extension connection. For this reason, the image files can be transferred to the recording apparatus and arranged in order without tiresome cable connection or recording medium setting. In addition, since transfer is done by extension connection, the user is charged no extra cost.

According to the second aspect of the present invention, there is provided an electronic camera system according to the first aspect, wherein when the image file is recorded in the recording apparatus, the electronic camera automatically erases the transmitted image file.

According to this system arrangement, the recording medium for the electronic camera, which has a limited capacity, can be efficiently used, in addition to the effect of the invention according to the first aspect.

According to the third aspect of the present invention, there is provided an electronic camera system according to the first aspect, wherein the electronic camera transmits only an image unrecorded in the recording apparatus to the recording apparatus through the first communication device and the second communication device.

According to this system arrangement, with minimum necessary communication, power can be effectively used without any waste, in addition to the effect of the invention according to the first aspect.

According to the fourth aspect of the present invention, there is provided an electronic camera system according to the first aspect, wherein the second communication device controls a power supply of the recording apparatus in position registration processing for the first communication device.

According to this system arrangement, the recording apparatus can be automatically powered on/off, in addition to the effect of the invention according to the first aspect.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment in which the present invention is applied to an electronic camera system using a PHS (Personal Handy phone System: 2nd-generation cordless telephone system) will be described below with reference to the accompanying drawing.

Figure 1:
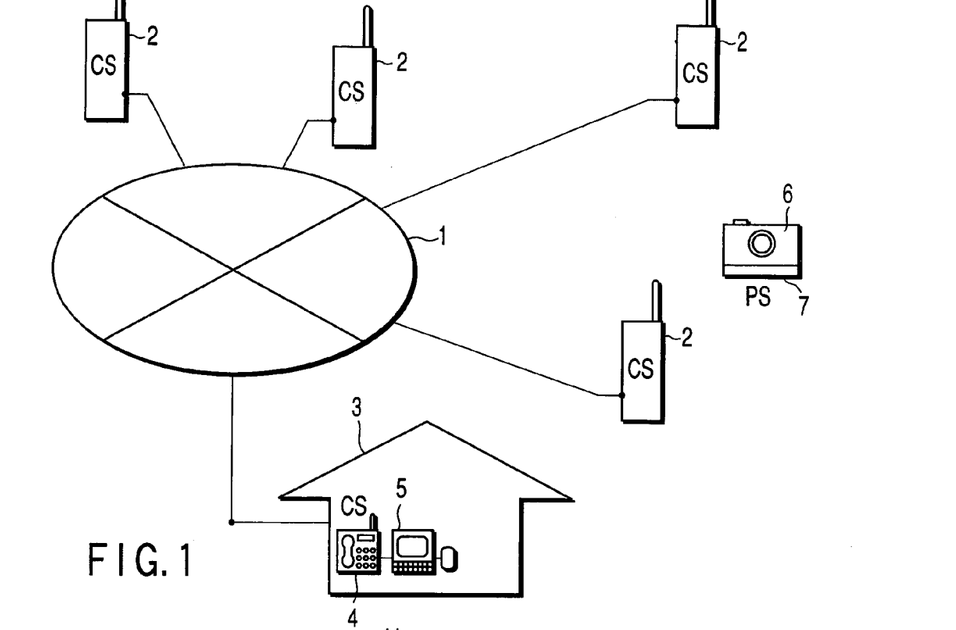
FIG. 1 is a view showing the overall arrangement of a system according to an embodiment of the present invention.

FIG. 1 shows the overall arrangement of the system. Referring to FIG. 1, reference numeral 1 denotes a public line network. A number of public base stations 2 are connected to the public line network 1. A private base station 4 installed in a private house 3 of the user (not shown) of this electronic camera system is also connected to the public line network 1.

The public base stations 2 are base stations (CS) for the public use, which are installed in public telephone boxes, on the rooftops of buildings, underground markets, and station platforms to be connected to many unspecified PHS terminals.

On the other hand, the private base station 4 is a base station (CS) installed in the private house 3, which serves as a master unit to be connected to only a PHS terminal registered by the user as a subsidiary unit. Communication (data transfer) between a plurality of PHS terminals registered as subsidiary units and communication (data transfer) between the private base station 4 and a PHS terminal registered as a subsidiary unit do not incur charge because it is extension connection.

In this embodiment, an electronic album apparatus 5 capable of storing image data sensed by an electronic camera in a large-capacity recording medium and displaying it as needed is connected to the private base station 4.

A PHS unit 7 as a PHS terminal exclusively used for data transfer of an electronic camera 6 shown in FIG. 1 is integrally attached to the bottom surface of the electronic camera 6 and carried by the user.

The PHS unit 7 threadably engages with the tripod attachment hole in the bottom surface of the electronic camera 6 through a screw. The PHS unit 7 is incapable of voice communication operation as a general PHS terminal. The PHS unit 7 is registered as a subsidiary unit of the private base station 4 as a master unit in advance. When the position of the PHS unit 7 is registered in the closest public base station 2 or private base station 4 by position registration processing automatically executed as the PHS unit 7 moves, it is connected to the public line network 1 by radio.

Figure 2:
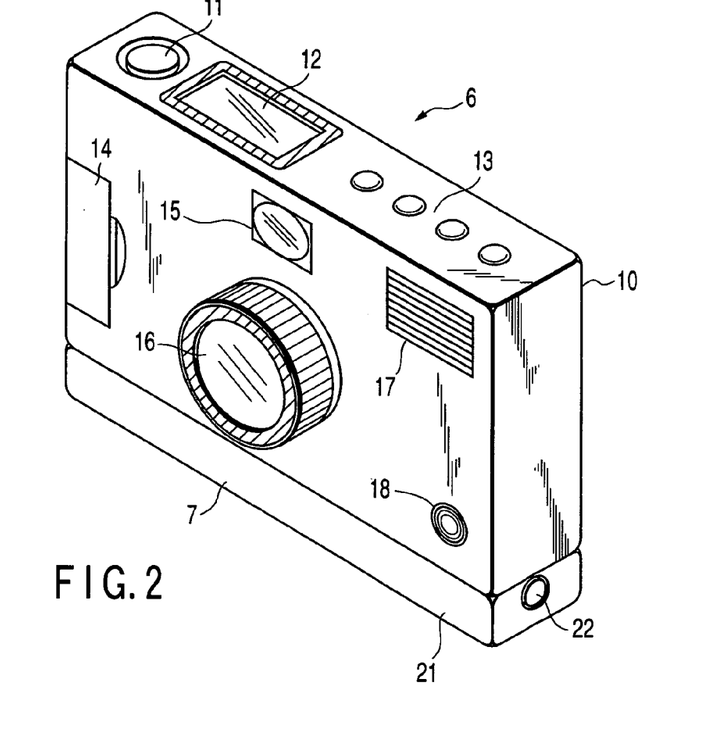
FIG. 2 is a view showing an example of the outer appearance of an electronic camera and PHS unit according to the embodiment.

FIG. 2 shows an example of the outer appearance of the electronic camera 6 having the PHS unit 7. Referring to FIG. 2, the electronic camera 6 has, on the upper surface of a rectangular parallelepiped camera body 10, a release switch (SW) 11, a guide panel 12 formed from an LCD panel having a backlight, and various mode switches 13.

A card slot cover 14 is attached from the right side surface to the front surface of the camera body 10 so as to freely open or close to cover a slot (not shown) for receiving a memory card as a recording medium of the electronic camera 6. An optical viewfinder window 15, lens 16, stroboscopic lamp 17, and self-timer lamp 18 are appropriately arranged on the front surface of the camera body 10.

Although not illustrated, a power switch, a color TFT-LCD panel also serving as an electronic viewfinder (EVF), and an optical viewfinder are arranged on the rear surface of the camera body 10.

The rectangular PHS unit 7 is integrally attached to the bottom surface of the electronic camera 6.

As described above, the PHS unit 7 threadably engages with the tripod attachment hole in the bottom surface of the electronic camera 6 through a screw. A power switch (SW) 22 is provided on the left end face of a thin plate-like unit body 21 having almost the same size as the bottom surface of the electronic camera 6.

When the PHS unit 7 is powered on by operating the power switch 22, data is transmitted/received through a connector formed on the bottom surface of the electronic camera 6, and image data sent from the electronic camera 6 in position registration processing for the private base station 4 is transferred to the private base station 4.

Figure 3:
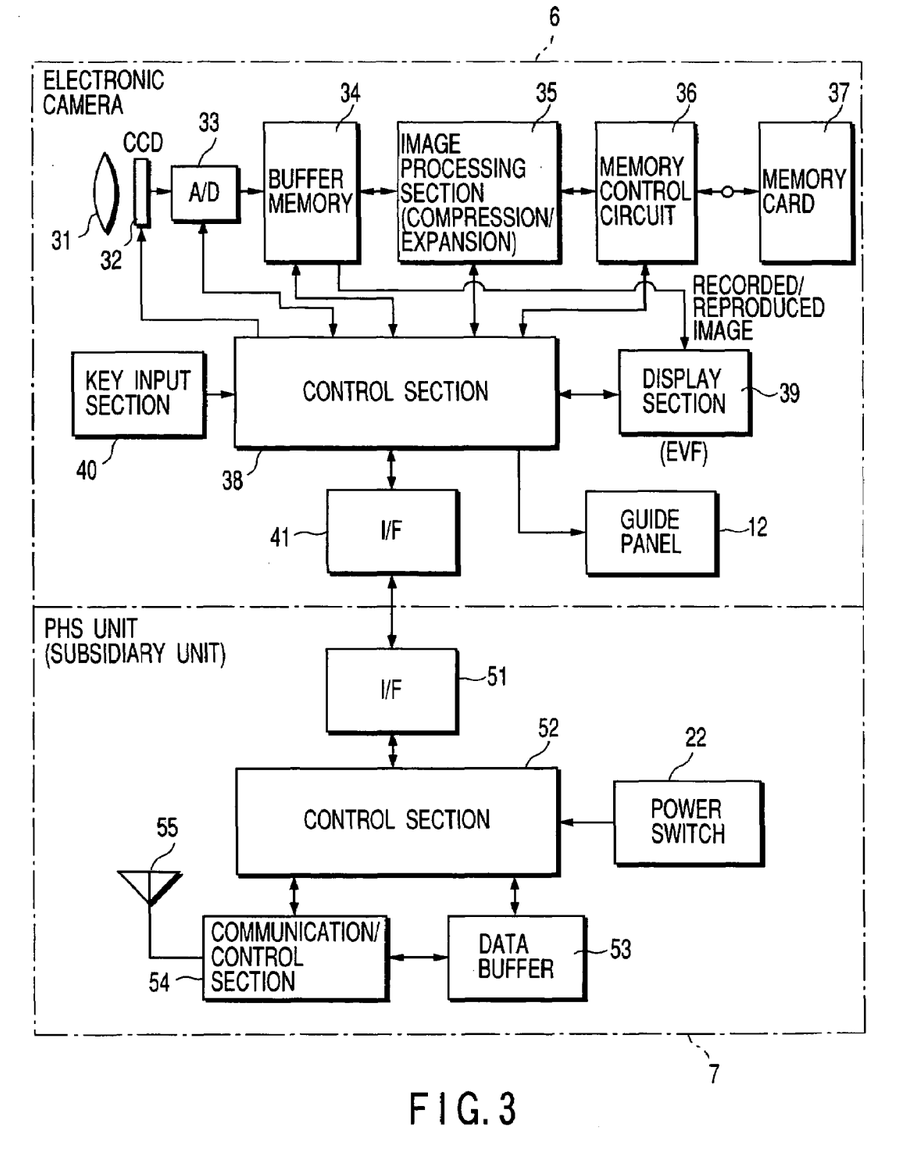
FIG. 3 is a block diagram showing the circuit arrangements of the electronic camera and PHS unit (subsidiary unit) according to the embodiment.

FIG. 3 shows the circuit arrangements of the electronic camera 6 and PHS unit 7.

In the electronic camera 6, the optical image of an object is formed on a CCD 32 by an optical lens system 31 in the recording mode. The output from the CCD 32 is digitized by an A/D converter 33 in units of pixels and sent to a buffer memory 34.

The buffer memory 34 stores a plurality of frames of image data in the bitmap format. Individual image data stored in the buffer memory 34 are compressed by an image processing section 35 into a predetermined file format, e.g., JPEG, sent to a memory control circuit 36, and written in a detachably inserted memory card 37 as the recording medium of the electronic camera 6.

At this time, image data with a much smaller number of pixels is also read out from the buffer memory 34 to a display section 39. On the basis of the image data, the display section 39 drives the TFT-LCD panel as an electronic viewfinder provided on the rear surface of the camera body 10, so the content sensed by the CCD 32 is displayed in real time.

In the reproduction mode, an image data file recorded on the memory card 37 is selectively read out by the memory control circuit 36, expanded by the image processing section 35 in accordance with a procedure reverse to that for compression processing and bitmapped, and then, stored in the buffer memory 34.

The image data stored in the buffer memory 34 is read out to the display section 39. On the basis of this image data, the display section 39 drives the TFT-LCD panel to reproduce and display the recorded image.

Operations of the CCD 32, A/D converter 33, buffer memory 34, image processing section 35, memory control circuit 36, and display section 39 are systematically controlled by a control section 38.

The control section 38 controls the operations of all circuits of the electronic camera 6. The control section 38 is also connected to a key input section 40, guide panel 12, and interface (I/F) section 41 to control them.

The key input section 40 including the release switch 11 and various mode switches 13 directly sends operation signals for these switches to the control section 38.

The guide panel 12 outputs and displays various operation states of the electronic camera 6 on the basis of a drive control signal from the control section 38.

The interface section 41 exchanges data between the control section 38 and PHS unit 7.

The PHS unit 7 has an interface (I/F) section 51 for data communication with the electronic camera 6, a control section 52 for controlling the operation of the entire PHS unit 7, the power switch 22, a data buffer 53, a communication control section 54 for transmitting/receiving a radio wave in the 1.9-GHz band as a PHS terminal, and an antenna 55 connected to the communication control section 54. Data sent from the interface section 41 of the electronic camera 6 is sent to the control section 52 through the interface section 51.

When the PHS unit 7 is powered on by operating the power switch 22, the control section 52 executes position registration processing for the closest base station CS using the communication control section 54 and antenna 55 in accordance with movement. Especially, when the position is registered for the private base station 4, the electronic camera 6 is activated to read out image data recorded on the memory card 37.

When the image data are sent from the electronic camera 6, they are held in the data buffer 53 and then sequentially transmitted from the antenna 55 to the private base station 4 by the communication control section 54.

Figure 4:
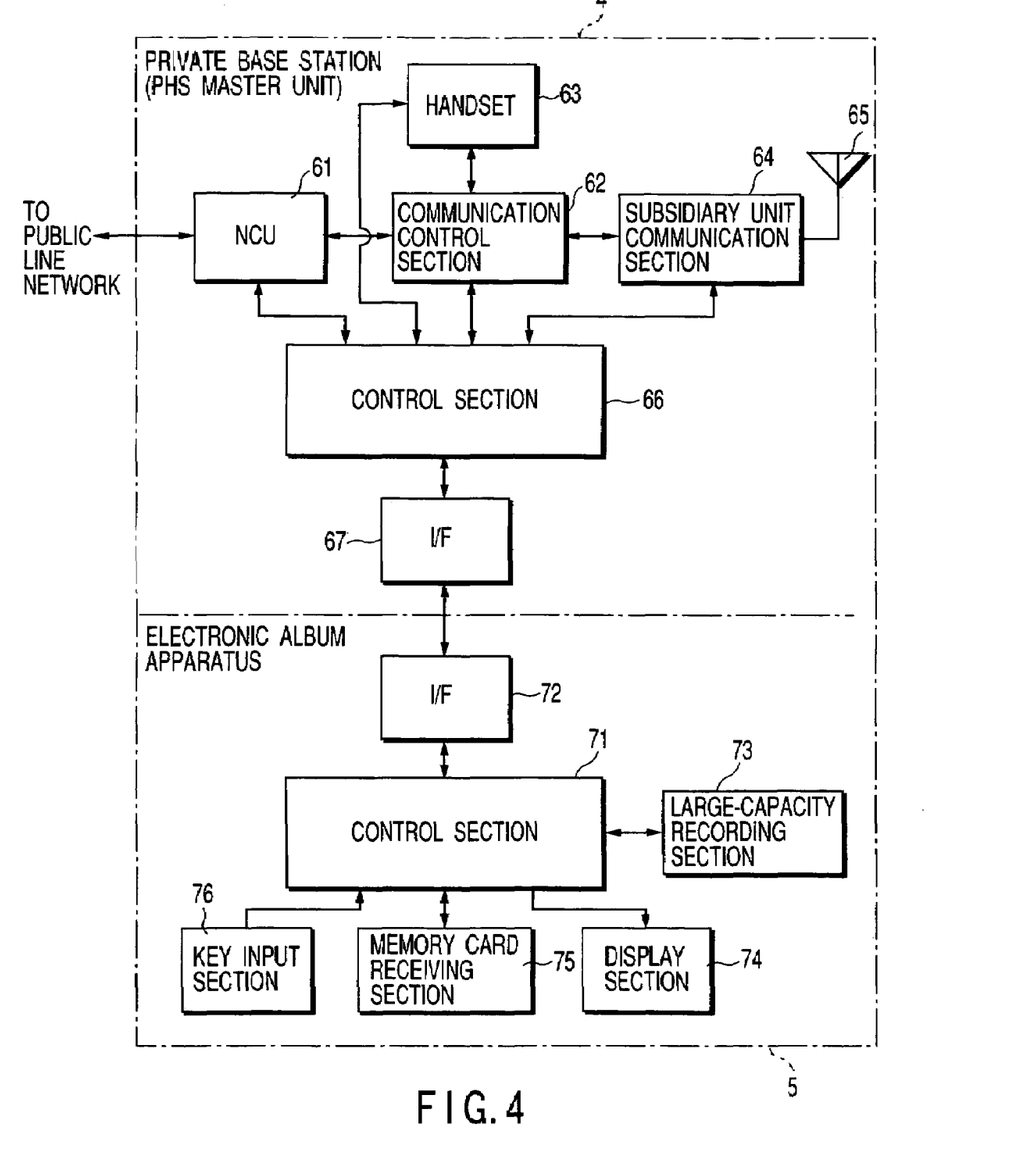
FIG. 4 is a block diagram showing the circuit arrangements of a private base station (master unit) and electronic album apparatus according to the embodiment.

The circuit arrangements of the private base station 4 and electronic camera 6 will be described next with reference to FIG. 4.

The private base station 4 comprises an NCU (Network Control Unit) 61 connected to the public line network 1, a communication control section 62 for controlling communication including voice communication, a handset 63 having a receiver and transmitter, a subsidiary unit communication section 64 for radio connection to a PHS terminal registered as a subsidiary unit, an antenna 65 connected to the subsidiary unit communication section 64, a control section 66 for controlling the entire operation of the private base station 4, and an interface (I/F) section 67 for connection to the electronic album apparatus 5.

To make a call, the NCU 61 automatically transmits the dial signal of the other party under the control of the control section 66. To receive a call, the NCU 61 is set in an off-hook state upon receiving a ringing signal from a telephone switching system.

The communication control section 62 performs voice/data communication with the public line network 1 through the NCU 61, and data transmission/reception and voice data conversion for voice/data communication with the PHS terminal registered as a subsidiary unit, through the subsidiary unit communication section 64 and antenna 65. The communication control section 62 transmits/receives communication data to/from the control section 66 and also transmits/receives voice to/from the handset 63.

The interface section 67 transmits/receives data to/from the electronic album apparatus 5 connected to the private base station 4.

In the electronic album apparatus 5, a control section 71 for controlling the entire operation is connected to an interface (I/F) section 72, large-capacity recording section 73, display section 74, memory card receiving section 75, and key input section 76.

The interface section 72 exchanges data between the private base station 4 and the control section 71.

The large-capacity recording section 73 is constructed by a device using a large-capacity rotating medium such as a hard disk device or magnetooptical disk device to record received image data files.

The display section 74 is constructed by a color TFT-LCD panel with a backlight, which has a diagonal size of, e.g., about 4 inches, and a driving circuit therefor. The display section 74 displays image data sent from the interface section 72.

The memory card receiving section 75 receives a memory card on which, e.g., a file of image data sensed by the electronic camera is recorded and reads out the image data file.

The key input section 76 has a power key and cursor keys used to select an image. The key operation signal is directly input to the control section 71.

The control section 71 reads out an image data file from the memory card inserted into the memory card receiving section 75 in correspondence with an input from the key input section 76 and records the data in the large-capacity recording section 73. Additionally, the control section 71 selectively reads out image data recorded in the large-capacity recording section 73 and displays it on the display section 74.

The operation of this embodiment will be described next.

Figure 5:
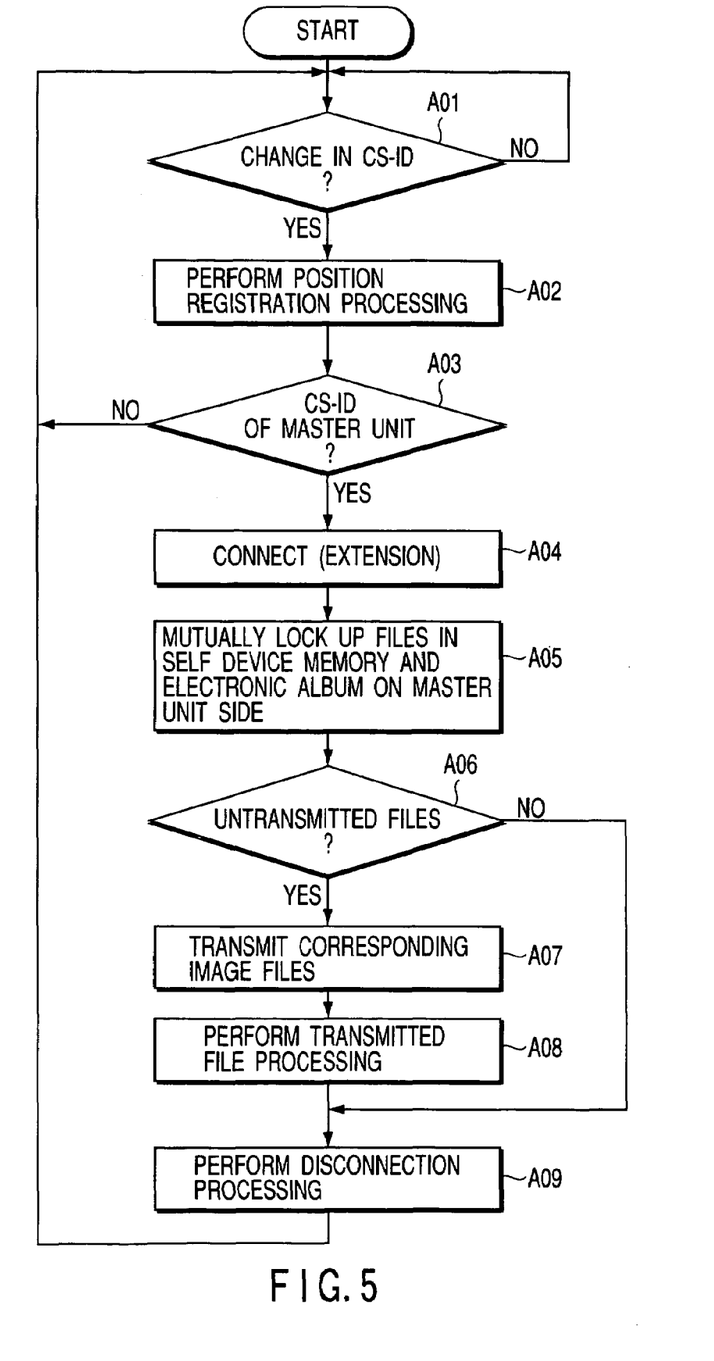
FIG. 5 is a flow chart showing the contents of operation processing by the electronic camera and PHS unit (subsidiary unit) according to the embodiment.

FIG. 5 shows the processing contents according to movement on the side of the electronic camera 6 integrated with the PHS unit 7 registered in the private base station 4 as a subsidiary unit. First, the PHS unit 7 stands by to check whether a change occurs in the closest public base station 2 or private base station 4 every predetermined time on the basis of a base station recognition number (CS-ID) obtained by communication with the base station (step A01).

If the base station recognition number changes, and it is determined that the closest base station capable of transmission/reception at the highest level has moved, predetermined position registration processing for that base station is executed (step A02). After that, it is determined whether the base station is not the public base station 2 but the private base station 4 for which the PHS unit 7 is registered as a subsidiary unit (step A03).

If the base station that has newly registered its position is not the private base station 4 but the public base station 2, the flow returns to step A01. If YES in step A03, this means that the PHS unit 7 enters the zone of the private base station 4 near the private house 3. The PHS unit 7 is immediately connected to the private base station 4 as a master unit to shift to the communication state (step A04). In this case, since the PHS unit 7 is registered in the private base station 4 as a subsidiary unit, the communication is extension connection that does not incur any charge.

Figure 6:
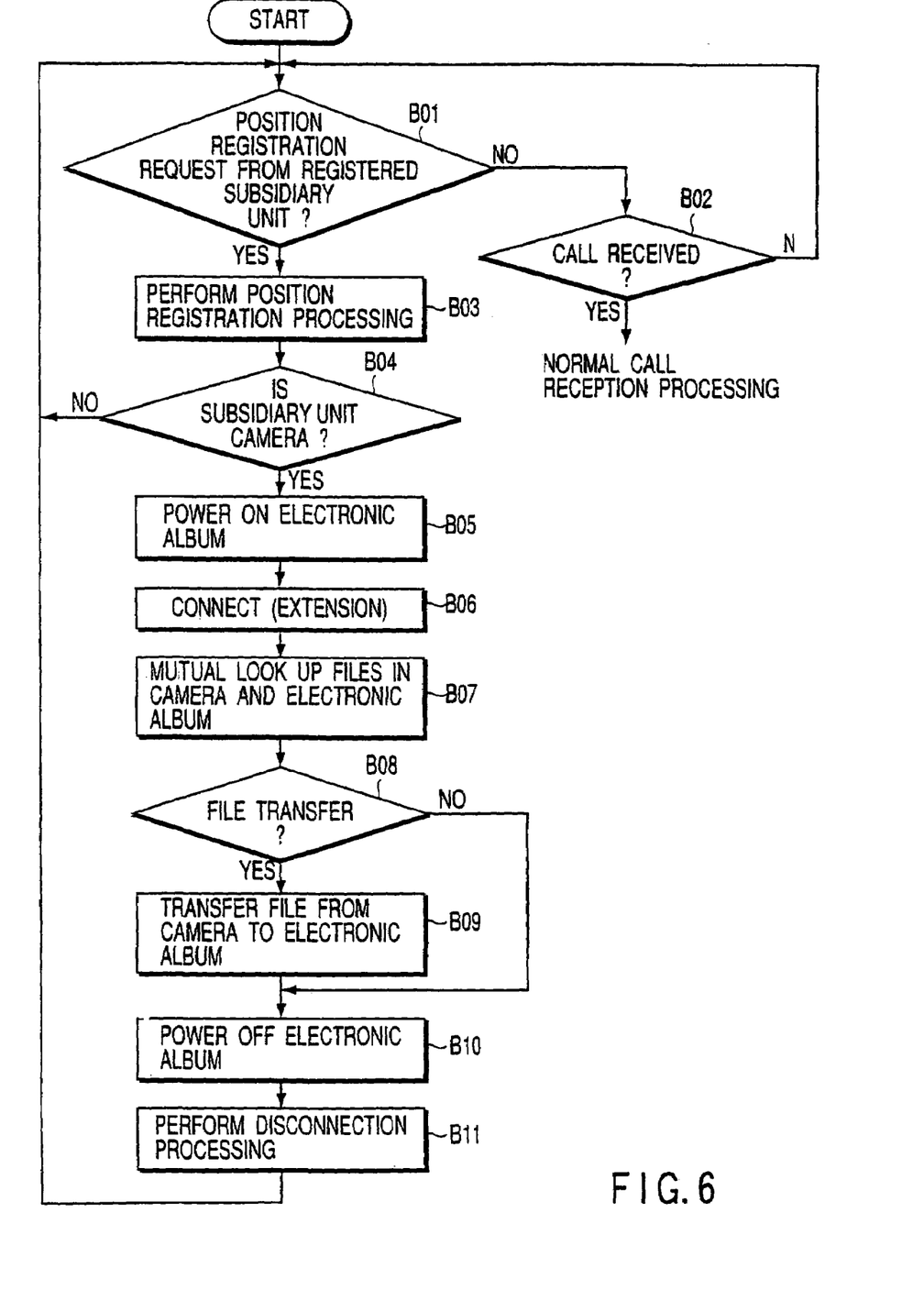
FIG. 6 is a flow chart showing the contents of operation processing by the private base station (master unit) and electronic album apparatus according to the embodiment.

FIG. 6 shows the processing contents on the private base station 4 and electronic album apparatus 5 side in the private house 3. First, the private base station 4 stands by to repeatedly determine whether a position registration request from a registered subsidiary unit or a call is received from the public line network 1 (steps B01 and B02).

When a position registration request from the registered subsidiary unit is received, the private base station 4 determines this state in step B01 and executes position registration processing for this subsidiary unit (step B03). After that, it is determined whether the subsidiary unit is the PHS unit 7 attached to the electronic camera 6 (step B04).

If NO in step B04, the flow returns to step B01. If YES in step B04, the electronic album apparatus 5 is immediately forcibly powered on through the interface section 67 (step B05). Simultaneously, the private base station 4 is connected to the PHS unit 7 as the subsidiary unit to shift to the communication state (step B06).

In this extension connection state, both of the electronic camera 6 and PHS unit 7 side and the private base station 4 and electronic album apparatus 5 side mutually look up image data files recorded on the memory card 37 in the electronic camera 6 and those already recorded in the large-capacity recording section 73 of the electronic album apparatus 5 (steps A05 and B07).

To mutually look up the image data files, first, the control section 38 of the electronic camera 6 reads out the file names of image data recorded on the memory card 37 at once, outputs them to the PHS unit 7 through the interface section 41, and causes the PHS unit 7 to transmit the file names to the electronic album apparatus 5 side through the private base station 4.

On the side of the electronic album apparatus 5 which has received the file names through the private base station 4, the control section 71 compares them with the file names of a number of image data recorded in the large-capacity recording section 73. Only file names that do not coincide are output to the private base station 4 through the interface section 72 as the file names of untransmitted image data and returned to the electronic camera 6 through the PHS unit 7.

In the electronic camera 6, the control section 38 checks whether the file names are returned from the electronic album apparatus 5 to determine whether untransmitted files are present (step A06). Only if YES in step A06, the files of image data corresponding to the returned file names are read out from the memory card 37 and output to the PHS unit 7 through the interface section 41. Then, the PHS unit 7 is made to transmit the image data files to the electronic album apparatus 5 side through the private base station 4 (step A07).

After that, as processing for the transmitted files, after a signal for confirming that the image data files are recorded in the large-capacity recording section 73 is returned from the electronic album apparatus 5 side, the already transmitted image data files on the large-capacity recording section 73 are erased at once (step A08).

After the series of processes of transmitting the image data file are executed, or if it is determined in step A06 that no transmitted files are present, processes in steps A07 and A08 are omitted. Disconnection processing is executed to end the extension connection state between the PHS unit 7 and the private base station 4 and electronic album apparatus 5 (step A09). Thus, the series of processes shown in FIG. 5 are ended, and the flow returns to step A01 again.

On the electronic album apparatus 5 and private base station 4 side, after the processing of mutually looking up the image data files in step B07, the control section 71 outputs the file names of the untransmitted image data to the private base station 4 through the interface section 72, and checks whether the image data file names are returned to the electronic camera 6 through the PHS unit 7 to determine whether the files of the untransmitted image data are to be transferred from the private base station 4 side (step B08).

Only if YES in step B08, the image data files transmitted subsequently are recorded in the large-capacity recording section 73 as they are received. When recording is complete, a signal for confirming recording in the large-capacity recording section 73 is output to the private base station 4 through the interface section 72 and transmitted to the electronic camera 6 side through the PHS unit 7 (step B09).

Then, independently of execution of processing in step B09, the electronic album apparatus 5 is powered off again (step B10). Simultaneously, the control section 66 in the private base station 4 executes disconnection processing to end the extension connection to the PHS unit 7 (step B11). Thus, the series of processes shown in FIG. 6 are ended, and the flow returns to step B01 again.

In the operation of the above embodiment, when even only one untransmitted image data file which is not recorded in the large-capacity recording section 73 of the electronic album apparatus 5 is present on the memory card 37 of the electronic camera 6 integrated with the PHS unit 7 which has entered the extension communication zone of the private base station 4, the file is unconditionally transferred via extension connection. However, the remaining capacity of the memory card 37 may also be taken into consideration, and it may be determined whether an untransmitted image data file is present by mutual lookup between the memory card 37 and the large-capacity recording section 73 only when the ratio of the remaining capacity to the total capacity of the memory card 37 has a predetermined value, e.g., 50% or less.

With this arrangement, only when further sensing will cause overflow in the memory card 37 of the electronic camera 6, image transfer by extension connection is executed, and consequently, the frequency of image transfer is reduced, thereby suppressing consumption of battery as the power supply of the PHS unit 7.

In the above embodiment, a PHS is used as a communication means. However, the present invention is not limited to this and can be applied to any other communication means such as specific low-power communication as far as the communication does not incur any charge.

The present invention is not limited to the above-described embodiment, and various changes and modifications can be made without departing from the spirit and scope of the invention.

Hence, according to the present invention, in the communication zone of the master unit, image files in the camera are automatically transferred to the recording apparatus by extension connection. For this reason, the image files can be transferred to the recording apparatus and arranged in order without cumbersome cable connection or recording medium setting. In addition, since transfer is done by extension connection, the user is charged no extra cost.

According to the present invention, the recording medium for the electronic camera, which has a limited capacity, can be efficiently used.

According to the present invention, with minimum necessary communication, power can be effectively used without any waste.

According to the present invention, the recording apparatus can be automatically powered on/off.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic camera having an imaging part which captures an image obtained by sensing and a communication part which communicates information with a master unit, the imaging part comprising:
a processing section which executes compression processing of the image captured; and
a recording section which records the processed image as an image file, the communication part comprising:
a transmission section which transmits the image file recorded in said recording section upon receiving base station identification information of the master unit in position registration processing according to movement, the master unit having registered a self device as a subsidiary unit;
a receiving section which receives an identifier of said image file recorded in said recording section from the master unit; and
a control section which activates the imaging part when the receiving section receives the base station identification information of the master unit,
wherein the receiving section receives the identifier of the image file which is recorded in the recording section but not recorded in a recording apparatus of the master unit, the transmission section transmits only an image file identified by said identifier which is received by said receiving section to the master unit, and the image file is recorded in the recording apparatus of the master unit upon being transmitted to the master unit by said transmission section.

2. The electronic camera according to claim 1, further comprising an erasing section, when the image file is recorded in said recording apparatus, which automatically erases the transmitted image file from the self device.

3. The electronic camera according to claim 1, further comprising:
a determining section which determines whether a base station capable of communication at the highest level is the master unit,
wherein the transmission section transmits the image file when the section determines that the base station capable of communication at the highest level is in the master unit.

4. The electronic camera according to claim 1, further comprising:
a disconnecting section which disconnects communication with the master unit after the image file is transmitted to the master unit.

5. An electronic camera system comprising:
an electronic camera; and
a personal handy phone unit attached to said electronic camera,
wherein said electronic camera comprises
image sensing means for sensing a target sensing object,
a memory card for recording an image of the target sensing object sensed by said image sensing means as an image file, and
a control section for transmitting a file name of the image file recorded on said memory card to said personal handy phone unit, searching said memory card for an image file corresponding to a file name of an untransmitted image file, the file name being transmitted from said personal handy phone unit, and transmitting the image file found by the search to said personal handy phone unit, and
said personal handy phone unit transmits a file name of the image file recorded on said memory card and sent from said control section to a master unit in which a self device is registered as a subsidiary unit, receives a file name of an untransmitted image file from the master unit, transmits an image file corresponding to the received file name of the untransmitted image file to said control section, and transmits the image file found by the search transmitted from said control section to the master unit.

6. An electronic camera system comprising:
an electronic camera having a unique identification code,
an imaging part which stores image sensing data into a nonvolatile memory and a communication part which activates the imaging part and which transfers image sensing data stored in the nonvolatile memory to a predetermined partner base station by data communication compatible to a personal handy phone system (PHS); and
a base station unit of the personal handy phone system (PHS) which has a unique identification code and a predetermined storage unit and is capable of data communication compatible to said personal handy phone system, and when the communication part of the electronic camera receives the identification code of the base station in position registration processing according to movement, the imaging part of the electronic camera is activated, and the base station unit performs data communication with said electronic camera and stores the transferred image sensing data in said predetermined storage unit,
wherein the electronic camera transfers only image sensing data which is identified as the unrecorded data in the predetermined storage unit of the base station unit to the base station unit and the image sensing data is recorded in the predetermined storage unit of the base station unit upon being transmitted by the electronic camera.

7. The electronic camera system according to claim 6, wherein said electronic camera is set as a subsidiary unit having said base station unit as a master unit and transfers the image sensing data only when said master unit and said subsidiary unit can directly perform data communication.

* * * * *